(12) United States Patent
Aburaya et al.

(10) Patent No.: US 9,839,882 B2
(45) Date of Patent: Dec. 12, 2017

(54) METHOD FOR PRODUCING ACID GAS SEPARATION COMPOSITE MEMBRANE, AND ACID GAS SEPARATION MEMBRANE MODULE

(71) Applicant: FUJIFILM Corporation, Tokyo (JP)

(72) Inventors: Yoshihiro Aburaya, Kanagawa-ken (JP); Makoto Sawada, Kanagawa-ken (JP); Satoshi Yoneyama, Kanagawa-ken (JP); Yoichi Hosoya, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 250 days.

(21) Appl. No.: 14/860,808

(22) Filed: Sep. 22, 2015

(65) Prior Publication Data

US 2016/0008766 A1    Jan. 14, 2016

Related U.S. Application Data

(63) Continuation of application No. PCT/JP2014/001826, filed on Mar. 28, 2014.

(30) Foreign Application Priority Data

Mar. 29, 2013 (JP) .................................. 2013-074327
Feb. 14, 2014 (JP) .................................. 2014-026265

(51) Int. Cl.
*B01D 53/22* (2006.01)
*B01D 69/12* (2006.01)
(Continued)

(52) U.S. Cl.
CPC .......... *B01D 69/12* (2013.01); *B01D 53/228* (2013.01); *B01D 63/10* (2013.01);
(Continued)

(58) Field of Classification Search
CPC .......................... B01D 67/0002; B01D 71/40; B01D 2256/16; B01D 53/22; B01D 71/80;
(Continued)

(56) References Cited

U.S. PATENT DOCUMENTS 3,649,346 A * 3/1972 Bridgeford ........... D06M 15/05
427/393.1
3,689,466 A * 9/1972 Burke ....................... C08B 3/22
260/DIG. 17

(Continued)

FOREIGN PATENT DOCUMENTS

EP          2239048 A1    10/2010
JP          59-189113 A   10/1984
(Continued)

OTHER PUBLICATIONS

Written Opinion for PCT/JP2014/001826 dated Aug. 5, 2015.
(Continued)

*Primary Examiner* — Anthony Shumate
(74) *Attorney, Agent, or Firm* — Sughrue Mion, PLLC

(57) ABSTRACT

A solution is to produce an acid gas separation composite membrane provided with an acid gas separation facilitated membrane on a porous support, including; arranging of a coating liquid for acid gas separation formed through dispersing or dissolving into water a polyvinyl acetal compound formed through crosslinking, by an acetal bond, block copolymers formed through bonding of a polymer block formed of polyvinyl alcohol and a polymer block formed of polyacrylate through a linking group, an acid gas carrier and at least one kind of anion other than hydroxide ion, carboxyl ion, carbonate ion and bicarbonate ion, and coating of the coating liquid for acid gas separation onto a hydrophobic (Continued)

surface of the porous support having hydrophobicity at least on one surface to form the acid gas separation facilitated transport membrane thereon.

11 Claims, 8 Drawing Sheets

(51) Int. Cl.
    *B01D 63/10*     (2006.01)
    *B01D 71/38*     (2006.01)
    *B01D 69/14*     (2006.01)
    *B01D 71/80*     (2006.01)
    *B01D 67/00*     (2006.01)
    *B01D 69/10*     (2006.01)
    *B01J 19/24*     (2006.01)
    *C09D 153/00*     (2006.01)
    *B01D 71/32*     (2006.01)
    *B01D 71/40*     (2006.01)

(52) U.S. Cl.
    CPC ......... *B01D 67/0002* (2013.01); *B01D 69/10* (2013.01); *B01D 69/142* (2013.01); *B01D 71/38* (2013.01); *B01D 71/80* (2013.01); *B01J 19/2475* (2013.01); *C09D 153/005* (2013.01); *B01D 53/22* (2013.01); *B01D 71/32* (2013.01); *B01D 71/40* (2013.01); *B01D 2256/16* (2013.01); *B01D 2256/20* (2013.01); *B01D 2257/304* (2013.01); *B01D 2257/504* (2013.01); *B01D 2323/30* (2013.01); *B01J 2219/24* (2013.01); *Y02C 10/10* (2013.01)

(58) Field of Classification Search
    CPC .... B01D 71/32; B01D 2256/20; B01D 63/10; B01D 69/12; B01D 53/228; B01D 69/142; B01D 2257/304; B01D 71/38; B01D 2323/30; B01D 2257/504; B01D 69/10; B01J 2219/24; B01J 19/2475; Y02C 10/10; C09D 153/005
    See application file for complete search history.

(56) References Cited

U.S. PATENT DOCUMENTS

| | | | |
|---|---|---|---|
| 5,349,023 A | | 9/1994 | Ikeda et al. |
| 6,187,872 B1 * | | 2/2001 | Yanase ............... A61L 15/60 525/330.2 |
| 2004/0185372 A1 * | | 9/2004 | Takakuwa .......... G03F 7/0007 430/270.1 |
| 2007/0099096 A1 * | | 5/2007 | Sasaki ................ G03F 7/0007 430/7 |
| 2009/0075048 A1 * | | 3/2009 | Mukunoki .......... B29C 47/0019 428/220 |
| 2009/0302271 A1 * | | 12/2009 | Dobashi .................. C08J 3/075 252/299.6 |
| 2010/0016872 A1 * | | 1/2010 | Bayon .................. A61F 2/0063 606/151 |
| 2010/0209723 A1 * | | 8/2010 | Tanaka .................. C08K 5/098 428/480 |
| 2010/0210752 A1 * | | 8/2010 | Muratoglu ........... C08F 261/04 523/113 |
| 2010/0221040 A1 * | | 9/2010 | Mitsumori ............. G03G 5/047 399/159 |
| 2011/0036237 A1 | | 2/2011 | Okada et al. |
| 2012/0219718 A1 | | 8/2012 | Okada et al. |
| 2012/0297976 A1 * | | 11/2012 | Sano ..................... B01D 53/22 95/47 |
| 2013/0160650 A1 | | 6/2013 | Okada et al. |
| 2013/0284022 A1 | | 10/2013 | Hiraki et al. |
| 2014/0137740 A1 | | 5/2014 | Aburaya et al. |
| 2015/0086801 A1 * | | 3/2015 | Hiraki ..................... B01J 20/02 428/500 |
| 2015/0151244 A1 * | | 6/2015 | Ishizuka ................ B01D 53/22 422/212 |
| 2015/0182917 A1 * | | 7/2015 | Hosoya ................ B01D 63/106 422/617 |
| 2016/0008768 A1 * | | 1/2016 | Yoneyama ............. B01D 69/12 427/245 |
| 2016/0136581 A1 * | | 5/2016 | Sawada ................. B01D 63/10 422/222 |

FOREIGN PATENT DOCUMENTS

| | | |
|---|---|---|
| JP | 5-214018 A | 8/1993 |
| JP | 7-60078 A | 3/1995 |
| JP | 7-102310 A | 4/1995 |
| JP | 2001-286741 A | 10/2001 |
| JP | 2008036463 A | 2/2008 |
| JP | 2009-195900 A | 9/2009 |
| JP | 2010-000435 A | 1/2010 |
| WO | 2012/096055 A1 | 7/2012 |
| WO | 2013/018538 A1 | 2/2013 |
| WO | 2013/018659 A1 | 2/2013 |

OTHER PUBLICATIONS

International Search Report for PCT/JP2014/001826 dated Aug. 5, 2015.

Communication dated Jun. 21, 2016, from the Japanese Patent Office in counterpart application No. 2014-026265.

Communication dated Jun. 28, 2016, from the European Patent Office in counterpart European Application No. 14772987.5.

Communication dated Apr. 18, 2016 from the State Intellectual Property Office of the P.R.C. issued in corresponding Application No. 201480018273.7.

Communication dated Oct. 24, 2017 from the European Patent Office in counterpart Application No. 14 772 987.5.

* cited by examiner

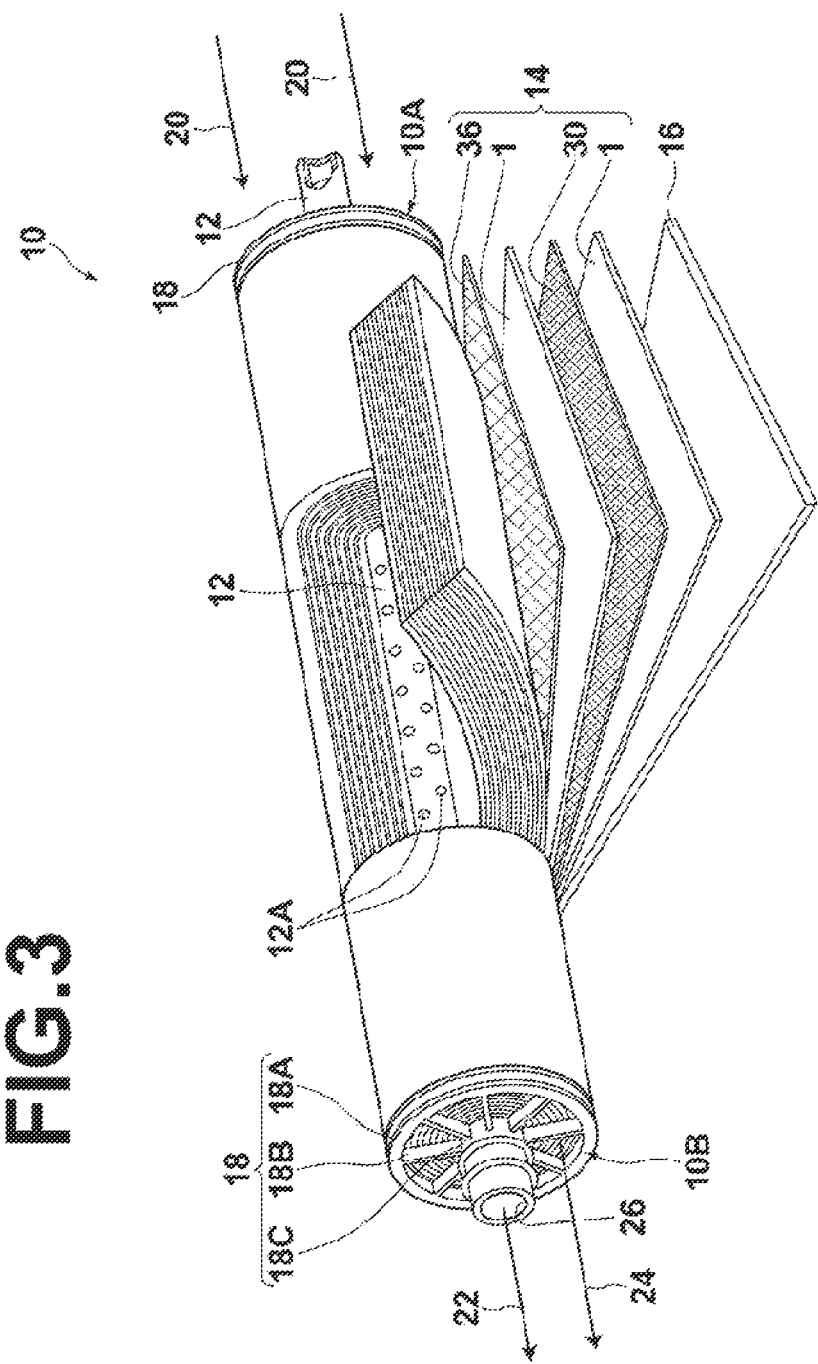

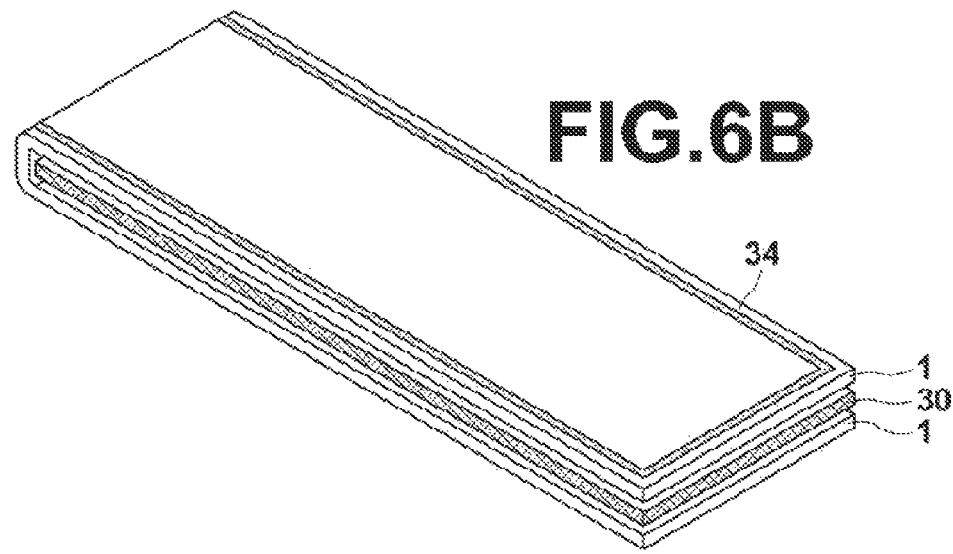
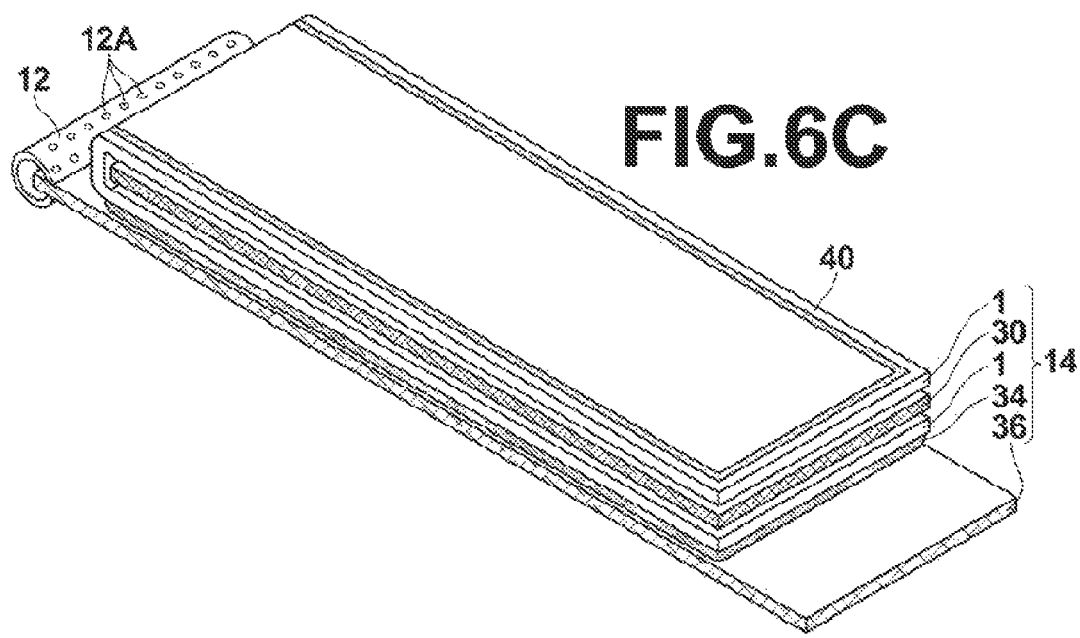

METHOD FOR PRODUCING ACID GAS SEPARATION COMPOSITE MEMBRANE, AND ACID GAS SEPARATION MEMBRANE MODULE

CROSS REFERENCE TO RELATED APPLICATIONS

The present application is a Continuation of PCT International Application No. PCT/JP2014/001826 filed on Mar. 28, 2014, which claims priority under 35 U.S.C. §119(a) to Japanese Patent Application No. 2013-074327, filed on Mar. 29, 2013, and Japanese Patent Application No. 2014-026265, filed on Feb. 14, 2014. Each of the above applications is hereby expressly incorporated by reference in its entirety, into the present application.

BACKGROUND

The present disclosure relates to a method for producing an acid gas separation composite membrane, and an acid gas separation membrane module, in which an acid gas in a gas to be separated is selectively separated using a facilitated transport membrane.

In recent years, development has advanced in techniques for selectively separating an acid gas such as $CO_2$ in a gas to be separated. For example, the development has been made on a module for gas separation for separating a $CO_2$ gas from the gas to be separated by a $CO_2$ gas separation membrane through which the $CO_2$ gas is selectively transmitted.

Gas separation membranes are generally classified into a facilitated transport membrane and a dissolution diffusion membrane. The facilitated transport membrane contains inside a membrane a substance (carrier) that selectively and reversibly reacts with one or a plurality of specific components inside the gas to be separated, and utilizes the carrier to transport the specific components on a side opposite to the membrane to cause separation. Moreover, the dissolution diffusion membrane utilizes differences in solubility in the membrane and diffusivity inside the membrane between the acid gas and a separation target substance.

The facilitated transport membrane utilizes transport based on a selective reaction between the specific component and the carrier. Thus, separation with high selectivity can be made, and a transmission rate of a separated gas inside the membrane is also high. Accordingly, the module for gas separation (facilitated transport type module for gas separation) in which the facilitated transport membrane is used has excellent separation characteristics, and has attracted attention.

In general, the facilitated transport type module for gas separation is provided with a member for fed gas flow channel serving as a flow channel of the gas to be separated to be fed, a gas separation member (gas separation composite membrane) in which the facilitated transport membrane is retained on a porous support, and a member for transmitted gas flow channel serving as a flow channel of a transmitted gas that is transmitted through the facilitated transport membrane, and separated.

In the gas separation composite membrane that plays a role of separation performance in the module for gas separation, high separation performance and high durability, and also production adaptability thereof are required. As the facilitated transport membrane having high carrier retention or a production method therefor, a facilitated transport membrane in which the membrane is formed by impregnating a carrier into a porous polymer membrane or a hydrogel membrane is disclosed (see Patent Documents 1 to 3).

Japanese Unexamined Patent Publication No. 7(1995)-060078 (hereinafter, Patent Document 1) discloses a method for producing a facilitated transport membrane that has excellent carbon dioxide separation performance and also excellent retention of a carbon dioxide carrier liquid, and even if the membrane is brought into contact with water, causes no easy reduction of membrane performance, in which a hydrophilic vinyl monomer vapor is brought into contact onto a support having a porous polymer membrane subjected to plasma treatment to form a hydrophilic polymer membrane thereon, and then the carbon dioxide carrier liquid is impregnated and retained thereinto through the hydrophilic polymer membrane.

Japanese Patent Publication No. 7(1995)-102310 (hereinafter, Patent Document 2) discloses a carbon dioxide separation device provided with a facilitated transport membrane that is formed by using as a support a hydrophilic porous membrane, and casting a copolymer gel containing a carbon dioxide carrier thereon. The Document describes that the hydrophilic porous membrane is used as the support to facilitate membrane formation and to fill pores of the porous membrane also with the copolymer gel, and therefore a carbon dioxide separation membrane having only a limited number of defects can be obtained.

Japanese Unexamined Patent Publication No. 2009-195900 (hereinafter, Patent Document 3) describes that an uncrosslinked copolymer liquid is coated onto a support, and then crosslinked to cause insolubilization in water, and then a carbon dioxide carrier aqueous solution is absorbed thereinto to allow production of a carbon dioxide separation membrane having excellent long-term stability and high shape retention.

SUMMARY

When a porous membrane is used as a support, and a liquid-state or gel-state coating liquid for a facilitated transport membrane is applied thereon, the coating liquid is easily permeated into the support due to capillary force, or even if the coating liquid results no permeation, a membrane surface is easily nonuniformized. In order to allow gas separation having satisfactory durability in use under a high pressure, high temperature and high humidity environment, in the facilitated transport membrane, permeation into micropores in a porous support, or nonuniformization on the surface thereof is preferably suppressed as much as possible. Under the high pressure, high temperature and high humidity environment, a high flow rate of a water vapor easily causes reduction of a viscosity term of a gel membrane over time or permeation of the gas separation membrane into the porous support in association therewith.

In the production methods in the above-described Patent Documents 1 and 3, no measures are taken at all against such permeation of the coating liquid into the support due to the capillary force. Moreover, in the method in Patent Document 2, the micropores in the support are positively filled with a gel of the facilitated transport membrane.

From a viewpoint of suppressing permeation of the coating liquid into the support due to the capillary force, the support preferably has hydrophobicity having low affinity with a hydrogel at least on the surface. However, from a viewpoint of membrane-forming properties for a hydrogel membrane on the support, coating of a liquid having the low affinity is difficult due to poor wettability.

The present disclosure has been made in light of the above-described problems, and the present disclosure provides a hydrogel-state composition for acid gas separation without causing permeation into the micropores in the porous support or nonuniformization of the surface thereof to satisfactorily allow formation of the membrane on the porous support having a hydrophobic surface. Moreover, the present disclosure provides an acid gas separation composite membrane having satisfactory durability under a high temperature, high humidity and high pressure environment by using the hydrogel-state composition.

According to the present disclosure, an acid gas separation composite membrane provided with an acid gas separation facilitated transport membrane on a porous support is produced by arranging a coating liquid for acid gas separation formed through dispersing or dissolving into water a polyvinyl acetal compound formed through crosslinking, by an acetal bond, block copolymers formed through bonding of a polymer block formed of polyvinyl alcohol and a polymer block formed of polyacrylate through a linking group, an acid gas carrier, and at least one kind of anion other than hydroxide ion, carboxyl ion, carbonate ion and bicarbonate ion, and coating the coating liquid for acid gas separation onto a hydrophobic surface of the porous support having hydrophobicity at least on one surface to form the acid gas separation facilitated transport membrane.

The acetal bond herein mainly is to mean an ordinary acetal bond, but may include a hemiacetal bond. The acetal bond includes a bond formed by two OH groups in polyvinyl alcohol blocks of different molecules, and aldehyde without exception, but may include the acetal bond formed by intramolecular two OH groups, and aldehyde.

Moreover, according to a general production method, as polyvinyl alcohol, a product in which an acetyl group is partially bonded with a molecule in a position in which the OH group is to be located is obtained in several cases. Accordingly, the acetyl group may be partially incorporated also into the polymer block formed of polyvinyl alcohol of the present disclosure.

Moreover, "polyvinyl acetal compound" means a compound formed through acetal bonding of at least part of hydroxyl group contained in the polymer block formed of polyvinyl alcohol.

Moreover, the polyacrylate is dissociated in water in several cases.

Moreover, "hydrophobicity" means that a contact angle with water at room temperature (25° C.) is 80 degrees or more.

In the method for producing the acid gas separation composite membrane of the present disclosure, as the linking group interposed between the polymer block formed of polyvinyl alcohol and the polymer block formed of polyacrylate, a sulfide group is preferred.

The coating liquid for acid gas separation preferably has a viscosity of 0.4 Pa·s or more and 50 Pa·s or less.

"Viscosity" of the coating liquid herein means a value at 60 rpm and at a liquid temperature of 25° C. in a B type viscometer. In general, if the temperature is high, the viscosity decreases, and if the temperature is low, the viscosity increases. However, a case where the viscosity is within the above-described viscosity range at the liquid temperature of 25° C. herein means that the viscosity is suitable for coating under an ordinary environment (about 10° C. to 35° C.).

The coating liquid for acid gas separation that is preferred in the method for producing the acid gas separation composite membrane of the present disclosure can be prepared by a preparation method having a mixed liquid preparation step for preparing a mixed liquid by mixing water and the block copolymer formed through bonding of the polymer block formed of polyvinyl alcohol and the polymer block formed of polyacrylate through the linking group, a crosslinking step for forming crosslinked structure by adding dropwise to the mixed liquid a crosslinking agent having an aldehyde group and an acid catalyst to form the acetal bond by the above-described polyvinyl alcohol and the above-described crosslinking agent while a temperature of the above-described reaction liquid is maintained at 25° C. to 50° C., a carrier addition step for adding to the above-described reaction liquid an acid gas carrier and mixing the resultant mixture during or after the crosslinking step; and a pH adjustment step for adjusting pH of the above-described reaction liquid toward a basic side after the above-described crosslinking step.

A contact angle between water and the hydrophobic surface of the porous support at room temperature (25° C.) is preferably 100 degrees or more. Specific examples of such a support include a support formed of a fluorine-based resin. As a fluorocarbon resin, polytetrafluoroethylene is preferred.

In the method for producing the acid gas separation composite membrane of the present disclosure, the coating liquid for acid gas separation is preferably coated onto the surface of the porous support through a hydrophobic intermediate layer having gas permeability. As such an intermediate layer, a silicone resin layer is preferred.

A module for acid gas separation of the present disclosure is a facilitated transport type module for acid gas separation for separating a fed gas to be separated into an acid gas and a remaining gas other than the acid gas and discharging the resultant gases, in which the module is provided with a member for fed gas flow channel through which the gas to be separated and the remaining gas are transmitted, an acid gas separation composite membrane produced by the method for producing the acid gas separation composite membrane of the present disclosure, and a membrane for transmitted gas flow channel through which the acid gas that is resulted from a reaction with the acid gas carrier and transmitted through the acid gas separation composite membrane flows.

In the present disclosure, an acid gas separation composite membrane is produced by using a coating liquid for acid gas separation as a coating liquid containing a polyvinyl acetal compound formed through crosslinking, by an acetal bond, block copolymers formed through bonding of a polymer block formed of polyvinyl alcohol and a polymer block formed of polyacrylate through a linking group, an acid gas carrier and water, and coating the coating liquid onto a hydrophobic porous support to form the acid gas separation facilitated transport membrane thereon. Such a composition is used as the coating liquid. Thus, the acid gas separation membrane can be formed on the hydrophobic porous support without causing permeation into micropores in the porous support and nonuniformization on the surface. Accordingly, according to the present disclosure, the acid gas separation composite membrane having satisfactory durability under a high temperature, high humidity and high pressure environment can be produced.

BRIEF DESCRIPTION OF THE DRAWINGS

FIG. 3 is a partially cut-away schematic structural view showing one embodiment of a module for acid gas separation of the present disclosure.

FIG. 6A is a diagram showing a process for producing a spiral type module.

FIG. 6B is a diagram, subsequent to FIG. 6A, showing the process for producing the spiral type module.

FIG. 6C is a diagram, subsequent to FIG. 6B, showing the process for producing the spiral type module.

DETAILED DESCRIPTION OF THE PREFERRED EMBODIMENTS

Method for Producing Acid Gas Separation Composite Membrane

Figure 1A:
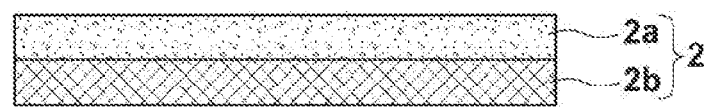
FIG. 1A is a diagram showing a preferred aspect of a support to be used in a method for producing a gas separation composite membrane of the present disclosure.
Figure 1B:
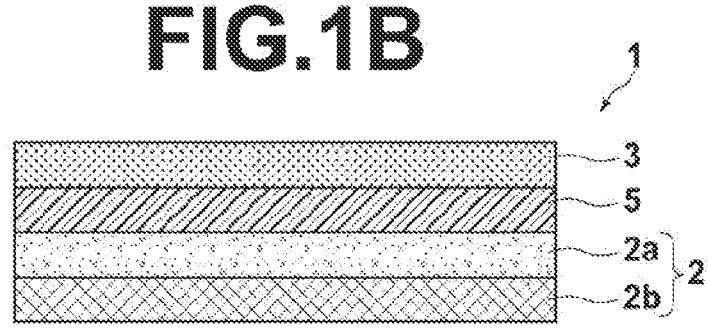
FIG. 1B is a diagram showing one embodiment of a gas separation composite membrane produced by a method for producing a gas separation composite membrane of the present disclosure.

A method for producing an acid gas separation composite membrane of one embodiment as related to the present disclosure is described, referring to drawings. FIG. 1A is a schematic cross-sectional view showing a preferred aspect of a porous support to be used in the method for producing the gas separation composite membrane of the present disclosure, and FIG. 1B is a schematic cross-sectional view showing one embodiment of an acid gas separation composite membrane having an acid gas separation facilitated transport membrane on a porous support. A scale of each portion is appropriately changed and shown for facilitating visual observation.

In the method for producing an acid gas separation composite membrane 1 of the present disclosure, the membrane 1 is produced by coating, onto a hydrophobic surface of a porous support 2 having hydrophobicity at least on one surface, a coating liquid for acid gas separation, the coating liquid containing a polyvinyl acetal compound formed through crosslinking, by an acetal bond, block copolymers formed through bonding of a polymer block formed of polyvinyl alcohol and a polymer block formed of polyacrylate through a linking group, an acid gas carrier, and water to form an acid gas separation facilitated transport membrane (hereinafter, referred to as a facilitated transport membrane) 3.

<Porous Support>

First, a porous support 2 having hydrophobicity at least on one surface as shown in FIG. 1A is arranged. As shown in FIG. 1A, the porous support 2 is formed through lamination between a hydrophobic porous support 2a and an auxiliary support 2b. Mechanical strength can be improved by having the auxiliary support 2b. Therefore, such lamination is effective in causing no wrinkles even if handling is performed in a coater or the like, and productivity can be improved.

The hydrophobic porous support 2a is a support having hydrophobicity at least on a surface on a side in contact with the facilitated transport membrane 3, and has permeability of the acid gas such as carbon dioxide being the gas to be separated. From a viewpoint of suppressing penetration of a facilitated transport material during forming the facilitated transport membrane, a pore diameter in the hydrophobic porous support 2a is preferably small. An average pore diameter is preferably 1 μm or less. A lower limit of the pore diameter is not particularly limited, but is about 0.005 μm.

Here, the average pore diameter is to mean a value measured and calculated by a bubble point method. The average pore diameter can be measured by the bubble point method (in accordance with JIS K 3832), for example, by using as a measurement instrument Perm Porometer manufactured by PMI, Inc. Here, the average pore diameter means a pore diameter having a peak in a pore diameter distribution in the porous support.

A thickness of the hydrophobic porous support 2a is preferably 5 μm or more and 100 μm or less.

Moreover, at least the surface of the hydrophobic porous support 2a on a side in contact with the facilitated transport membrane 3 is hydrophobic. If the surface is hydrophilic, the facilitated transport membrane into which moisture is incorporated under a use environment is easily penetrated into a porous portion to have an anxiety of causing a thickness distribution or performance deterioration over time.

The hydrophobic porous support 2a is preferably a porous membrane (sheet) formed of a resin material such as polyester, polyolefin, polyamide, polyimide, polysulfonearamid, polycarbonate, polypropylene, polysulfone, polyether ketone, polyethersulfone and a fluorine-based resin.

The module for acid gas separation to which the acid gas separation composite membrane 1 as related to the present disclosure is applied is used, although a use temperature is different according to use in an application, for example, at a high temperature of about 130° C. and under humidification in which a vapor is used in many cases. Therefore, the porous membrane is preferably formed of a raw material having heat resistance to cause only a limited change in pore structure even at 130° C., and only limited hydrolyzability. From such a viewpoint, the membrane is preferably formed in containing a resin selected from the group consisting of polypropylene and a fluorine-containing resin such as polytetrafluoroethylene (PTFE) and polyvinylidene fluoride (PVDF), and most preferably a PTFE porous membrane.

The auxiliary support 2b is not particularly limited, as long as strength, stretch resistance and gas permeability are satisfactory, with which the auxiliary support 2b can bound the hydrophobic porous support 2a to suppress deformation of the hydrophobic porous support 2a under a high pressure and high humidity environment, and a nonwoven fabric, a woven fabric, a mesh having an opening diameter of 0.1 μm or more and 2,000 μm or less, or the like can be appropriately selected and used. However, a nonwoven fabric of resin fibers having excellent durability and heat resistance is preferred.

Specific examples of such resin fibers include fibers composed of a heat-resistant resin such as polypropylene, modified polyamide such as Aramid (trade name), and a fluorine-containing resin such as polytetrafluoroethylene and polyvinylidene fluoride.

If the auxiliary support $2b$ is too thick, the gas permeability decreases, and if the support $2b$ is too thin, the support $2b$ has an anxiety of difficulty in obtaining sufficient strength. Therefore, a thickness of the auxiliary support $2b$ is preferably 30 μm or more and 500 μm or less, further preferably 50 μm or more and 450 μm or less, and particularly preferably 50 μm or more and 400 μm or less.

Moreover, from viewpoints of sufficiently infusing an adhesive into a sealed portion 4 in an adhesive coating region to allow formation of an effective gas impermeable region and simultaneously causing no hindrance of gas passage in a region onto which no adhesive is applied, an average pore diameter of openings in the auxiliary support $2b$ is preferably 0.001 μm or more and 200 μm or less, further preferably 0.002 μm or more and 200 μm or less, and particularly preferably 0.005 μm or more and 200 μm or less.

The lamination between the hydrophobic porous support $2a$ and the auxiliary support $2b$ may be made in any aspect, but from a viewpoint of productivity, an aspect of being closely contacted by a heat press method using a heat roller or a hot plate is preferred. In the heat press method, adhesion between the hydrophobic porous support $2a$ and the auxiliary support $2b$ can be performed without needing the adhesive, and therefore such a case is preferred.

<Intermediate Layer>

As already stated, in the porous support 2 (hydrophobic porous support $2a$) of the acid gas separation composite membrane 1, from a viewpoint of suppressing penetration of the facilitated transport material during formation of the facilitated transport membrane, at least the surface on the side in contact with the facilitated transport membrane 3 has hydrophobicity. Moreover, in the facilitated transport membrane 3, in order to allow the carrier to sufficiently function, a large amount of moisture needs to be retained inside the membrane, and therefore a polymer having significantly high water absorptivity and water retention is used. In addition thereto, in the facilitated transport membrane, accordingly as a content of the carrier such as metal carbonate is higher, an amount of water absorption increases and separation performance of the acid gas is improved. Therefore, the facilitated transport membrane 3 is a gel membrane or a membrane having low viscosity in many cases. Further, during separation of the acid gas, a raw material gas at a temperature of about 100 to 130° C. and a humidity of about 90% is fed under a pressure of about 1.5 MPa. Therefore, during use, the separating layer is gradually infiltrated (penetrated) into the porous support, and a capability of separating the acid gas tends to decrease over time.

Accordingly, the acid gas separation composite membrane 1 is preferably provided with, between the hydrophobic porous support $2a$ and the facilitated transport membrane 3, the intermediate layer 5 that further effectively suppresses the penetration of the facilitated transport material (membrane) into the porous support 2 (hydrophobic porous body $2a$).

The intermediate layer 5 is not particularly limited, as long as the intermediate layer 5 is a hydrophobic layer having gas permeability, but is preferably a layer that has air permeability and is denser in comparison with the hydrophobic porous support $2a$. The membrane 1 is provided with such an intermediate layer 5. Thus, the membrane having high uniformity can be formed by preventing the facilitated transport membrane 3 from infiltrating into the porous support.

The intermediate layer 5 only needs to be formed on the hydrophobic porous support $2a$, but may have a penetration region that is penetrated into the hydrophobic porous support $2a$. The penetration region is preferably as small as possible within the range in which the adhesion between the hydrophobic porous support $2a$ and the intermediate layer 5 is satisfactory.

As the intermediate layer 5, a polymer layer having a siloxane bond inside a repeating unit is preferred. Specific examples of such a polymer layer include organopolysiloxane (silicone resin) and silicone-containing polyacethylene such as polytrimethylsilylpropyne.

Specific examples of the polyorganosiloxane preferably include straight-chain silicone such as polydimethylsiloxane (PDMS), polymethylphenylsiloxane and polymethylhydrogensiloxane, and modified silicone in which an amino group, an epoxy group, an alkyl halide group or the like is introduced into a side chain.

A silicone resin layer is preferably formed by coating and membrane formation. A coating liquid (silicone coating liquid) used for the membrane formation contains a monomer, a dimer, a trimer, an oligomer or a prepolymer of a compound serving as the silicone resin layer, or a mixture thereof, and further may contain a curing agent, a curing promoter, a crosslinking agent, a thickener, a reinforcing agent or the like. Viscosity during coating the coating liquid is preferably 300 cp or more.

In addition, the silicone coating liquid preferably does not contain any organic solvent that is ordinarily used upon forming such a resin layer. The silicone coating liquid contain no organic solvent, which has advantages of eliminating necessity of a step for drying the silicone coating liquid to have a capability of curing of the monomer or the like immediately after the silicone coating liquid is coated, a capability of simplifying production facilities (capability of eliminating necessity of conversion into electricity discharging facilities or explosion-proof facilities), or the like.

Moreover, a surface of the intermediate layer 5 on a side of the facilitated transport membrane may be a smooth surface, but also may be a finely irregular surface. The intermediate layer 5 has fine irregularity on the surface. Thus, adhesion between the intermediate layer 5 and the facilitated transport membrane 3 can be improved. An aspect is formed through containing, in the silicone coating liquid, spherical or plate-shaped inorganic fine particles such as silica, aerosil, titania, alumina, carbon, boron nitride, talc and zeolite. Thus, the fine irregularity can be easily formed on the surface by coating and membrane formation. An average particle diameter of the inorganic fine particles is preferably in the range of 0.001 μm to 30 μm.

The intermediate layer 5 is a membrane having gas permeability, but if the intermediate layer 5 is too thick, has a possibility of significantly reducing the gas permeability. The intermediate layer 5 may be thin, as long as the intermediate layer 5 wholly and entirely covers the surface of the hydrophobic porous body $2a$. If this regard is taken into consideration, a membrane thickness of the intermediate layer 5 is preferably 0.01 μm or more and 10 μm or less, and further preferably 0.1 μm or more and 5 μm or less.

<Formation of Acid Gas Separation Facilitated Transport Membrane>

As described above, the porous support 2 having hydrophobicity at least on one surface is arranged, and then the acid gas separation facilitated transport membrane 3 (hereinafter, referred to as the facilitated transport membrane 3 in several cases) is formed by coating, onto the hydrophobic surface, the coating liquid for acid gas separation, the coating liquid containing the polyvinyl acetal compound formed through crosslinking, by the acetal bond, the block copolymers formed through bonding of the polymer block formed of polyvinyl alcohol (PVA) and the polymer block formed of polyacrylate (PAA) through the linking group, the acid gas carrier, and water to form the acid gas separation facilitated transport membrane 3 thereon (FIG. 1B).

Even in a state in which the coating liquid is only coated onto the porous support 2 (a state in a so-called coated membrane), the facilitated transport membrane 3 has sufficient acid gas separation performance as the facilitated transport membrane. On the other hand, if processing into a module is taken into consideration, handling properties are poor in a state of a membrane containing a large amount of moisture. Thus, a material that is dried after coating and membrane formation is currently preferably applied as the acid gas separation facilitated transport membrane 3. Accordingly, the method preferably has a drying step for removing water inside the coating liquid after the coating liquid for acid gas separation is coated to form the membrane. Here, a degree of drying is not particularly limited, and the facilitated transport membrane 3 may contain moisture within the range in which no defect is caused upon processing into the module.

As described in the item of "Technical Problem," with regard to membrane formation onto the surface of the hydrophobic porous support that can suppress permeation of the coating liquid into the support due to the capillary force, coating of the liquid having low affinity is difficult due to poor wettability.

Therefore, also in Patent Document 2 or the like, a membrane of a hydrogel of a copolymer of PVA and PAA (referred to as a PVA-PAA copolymer) is formed on a surface of a hydrophilic porous support to form the facilitated transport membrane. Thus, it has been known so far that the PVA-PAA copolymer is a hydrophilic polymer and can form the hydrogel.

In general, an ordinary gel of the PVA-PAA copolymer is a latex-state polymer formed by suspension polymerization, and well known as a SAP (Super Absorbent Polymer) material. However, in a case of coating of the latex, a possibility of forming a nonuniform surface is suggested from a finding in the past.

The present inventors has considered that, as the PVA-PAA copolymer, a copolymer having higher water absorptivity and better surface smoothness upon membrane formation in an application as the acid gas separation facilitated transport membrane, and attempted to prepare a polyvinyl acetal compound formed through crosslinking, by the acetal bond, block copolymers (PVA-X-PAA copolymers: straight-chain PVA-X-PAA) formed through linearly bonding of the polymer block formed of polyvinyl alcohol (PVA) and the polymer block formed of polyacrylate (PAA) through the linking group, in which hydrogel strength is higher even during high water absorption, in comparison with an ordinary latex polymer such as a PVA-PAA gel.

The present inventors have attempted to introduce crosslinked structure into straight-chain PVA-X-PAA by acetalization under crosslinking conditions for the PVA-PAA copolymer described in Patent Document 2. However, a phenomenon of causing precipitates in a crosslinked polymer solution is observed by introduction of the crosslinked structure under the conditions described in Patent Document 2. Further, the viscosity of the coating liquid has been about 0.02 Pa·s even at a high level, and the coating liquid having excellent coating adaptability has been unobtainable. In the hydrogel of the polymer formed through crosslinking of PVA structure, the viscosity is generally considered to increase by improving a degree of crosslinking. Thus, introduction of the crosslinked structure by acetalization is considered to be incapable of being sufficiently performed under the conditions described in Patent Document 2.

Consequently, the present inventors have diligently studied on preparation conditions for introduction of the crosslinked structure by acetalization of straight-chain PVA-X-PAA.

As a result, the present inventors have found that the coating liquid for acid gas separation, the coating liquid having viscosity for excellent coating adaptability onto the hydrophobic porous support, can be prepared by a preparation method having a mixed liquid preparation step for preparing a mixed liquid by mixing water and a block copolymer formed through bonding of the polymer block formed of polyvinyl alcohol and the polymer block formed of polyacrylate through the linking group, a crosslinking step for forming crosslinked structure by adding dropwise to the mixed liquid a crosslinking agent having an aldehyde group and an acid catalyst to form the acetal bond by alcohol and the crosslinking agent while a temperature of the mixed liquid is maintained at 25° C. to 50° C., and a carrier addition step for adding to the mixed liquid an acid gas carrier and mixing the resultant mixture during or after the crosslinking step, and a pH adjustment step for adjusting pH of the mixed liquid toward a basic side after the crosslinking step.

The coating liquid for acid gas separation prepared by such a method has been confirmed to have high coating adaptability, and the acid gas separation composite membrane 1 having the facilitated transport membrane 3 obtained by coating the coating liquid onto the hydrophobic porous support 2 to form the membrane has been confirmed to have good adhesion between the facilitated transport membrane 3 and the hydrophobic porous support 2, and high separation performance (see Examples described later).

The present inventors consider that such high adhesion is achieved by improvement in affinity of the coating liquid onto the hydrophobic surface of the porous support by using the block copolymer formed through bonding of PVA and PAA through the linking group as the block copolymer before being crosslinked, in comparison with a case of a block copolymer having no linking group.

A temperature of the coating liquid during coating and membrane formation is ordinarily 15° C. or higher and 35° C. or lower. If coating adaptability onto the hydrophobic porous support is taken into consideration, the present inventors consider that a viscosity of 0.4 Pa·s or more and 50 Pa·s or less (400 to 50,000 cp) is required as the coating liquid in such a temperature range. However, from viewpoints of surface properties after coating and a high rate, the viscosity is preferably 0.5 Pa·s or more and 2 Pa·s or less (500 to 2,000 cp), and further preferably 1 Pa·s or more and 2 Pa·s or less (1,000 to 2,000 cp).

The coating liquid for acid gas separation prepared in the above-described production process has good coating adaptability, and therefore this coating liquid is used. Thus, the facilitated transport membrane 3 can be formed on the hydrophobic porous support 2a without causing permeation into micropores of the porous support and nonuniformization on the surface. Accordingly, in the acid gas separation composite membrane 1, separation of the acid gas with satisfactory durability can be performed under the high temperature, high humidity and high pressure environment.

Preferred aspects are described for each step below.

(Mixed Liquid Preparation Step)

In the mixed liquid preparation step, a mixed liquid is prepared by mixing water and the block copolymer (straight-chain PVA-X-PAA) formed through bonding of the polymer block formed of polyvinyl alcohol and the polymer block formed of polyacrylate through the linking group.

The straight-chain PVA-X-PAA preferably has high hydrophilicity so as to form a gel having good water absorptivity. From such a viewpoint, a content of polyacrylate in the straight-chain PVA-X-PAA copolymer is preferably 5 mol % or more and 95 mol % or less, and further preferably 5 mol % or more and 70 mol % or less. Specific examples of the polyacrylate include alkali metal salt such as sodium salt and potassium salt, and also ammonium salt and organic ammonium salt. Specific examples of the linking group —X— include a sulfide group, an amino group, an alkyl group and an ether group, but a sulfide group is preferred.

Upon dissolving the straight-chain PVA-X-PAA into water to prepare the reaction liquid, an amount of water is preferably 0.1 mass % or more and 90 mass % or less, and further preferably 1 mass % or more and 90 mass % or less.

(Crosslinking Step)

Next, the polyvinyl acetal compound formed through crosslinking of PVA-X-PAA by the acetal bond is formed by adding dropwise the crosslinking agent having an aldehyde group and the acid catalyst to the prepared mixed liquid, and the resultant mixed liquid is stirred while a temperature of the mixed liquid is maintained at 25° C. to 50° C. to form the acetal bond by polyvinyl alcohol and the crosslinking agent to cause crosslinking of PVA-X-PAA.

The crosslinking agent having the aldehyde group is not particularly limited. In order to obtain a high degree of crosslinking, bifunctional or higher functional aldehyde is preferred, and glutaraldehyde (GA) or terephthalaldehyde can be preferably applied.

The acid catalyst is not particularly limited, and general acid such as hydrochloric acid, sulfuric acid and nitric acid can be applied. An amount of addition of acid is preferably 3 mol/L or less.

Here, the conditions have been found, in which the acid catalyst is added dropwise, and the resultant mixed liquid is stirred while the temperature of the mixed liquid is maintained at 25° C. to 50° C. Thus, acetalization can be achieved under mild conditions. The acid catalyst is added thereto. Thus, the acetal bond can be formed by a hydroxyl group of polyvinyl alcohol and an aldehyde group in the straight-chain PVA-X-PAA without causing precipitates, and the coating liquid for acid gas separation, the coating liquid having a viscosity of 0.4 Pa·s or more and 50 Pa·s or less at which coating adaptability is excellent, can be obtained.

In order to form the coating liquid having the above-described viscosity, with regard to a degree of crosslinking by acetalization, the degree of crosslinking is preferably 0.001% or more and 2% or less, further preferably 0.002% or more and 1% or less, and still further preferably 0.003% or more and 0.92% or less in terms of a ratio of functional groups.

Here, "degree of crosslinking" of the polyvinyl acetal compound is to be expressed in terms of a value calculated as a ratio (mol %) in an amount of a crosslinked functional group to an amount of total crosslinkable functional groups in PVA-X-PAA being a polymer to be crosslinked, more specifically, an amount of the hydroxyl group in polyvinyl alcohol. Here, the amount of the crosslinked functional group is to mean the amount of the hydroxyl group subjected to the acetal bond or hemiacetal bond. An actual crosslinking reaction is carried out until the added crosslinking agent achieves a reaction in equivalent amount. Therefore, the amount of the crosslinked functional group has a meaning identical with an amount in the added crosslinking agent reactable with the hydroxyl group. Here, a change of viscosity is measured in judgment of the reaction in equivalent amount, and at a time point at which the viscosity is stabilized for several hours, the reaction is judged to reach the reaction in equivalent amount.

The acetalization of the aldehyde group results in the acetal bond serving as an aspect in which two hydroxyl group moieties react with one aldehyde group to form an ether bond, respectively; and the hemiacetal bond serving as an aspect in which one hydroxyl group moiety reacts with one aldehyde group to form an ether bond. When polyfunctional aldehyde such as glutaraldehyde is used, or the like, the crosslinked structure may be formed by any bond. Accordingly, in a crosslinking agent having one aldehyde group, an amount reactable with the hydroxyl group is taken as 2 mol based on 1 mol of crosslinking agent. In bifunctional aldehyde such as glutaraldehyde, an amount reactable with the hydroxyl group is taken as 4 mol. More specifically, a degree of crosslinking of 2% means that 2% of the reacted functional group exists based on total functional groups in PVA-X-PAA.

Upon using the membrane as the facilitated transport membrane, the membrane holds water to exhibit a separation function of the acid gas by the acid gas carrier. Accordingly, the polyvinyl acetal compound formed through crosslinking of the straight-chain PVA-X-PAA by the acetal bond can be dissolved or dispersed into water to form the coating liquid, and simultaneously from a viewpoint of the acid gas separating layer having high water absorptivity (moisture retention), the polyvinyl acetal compound preferably has high water absorptivity, and preferably absorbs water in a mass of 1.05 times or more and 1,000 times or less based on a mass of a hydrophilic compound per se.

Figure 2A:
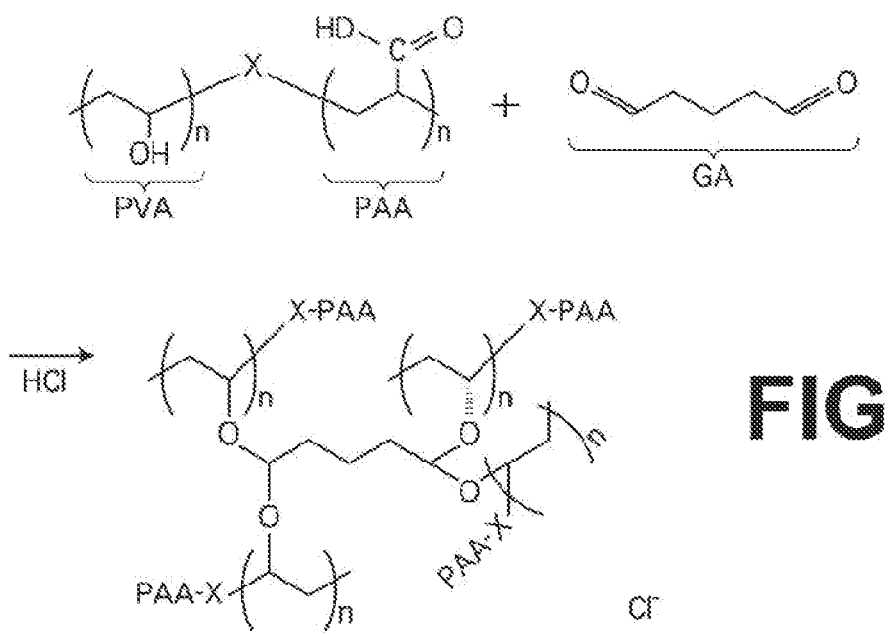
FIG. 2A presents a reaction formula in a case where polyvinyl alcohol causes acetal bonding between molecules.
Figure 2B:
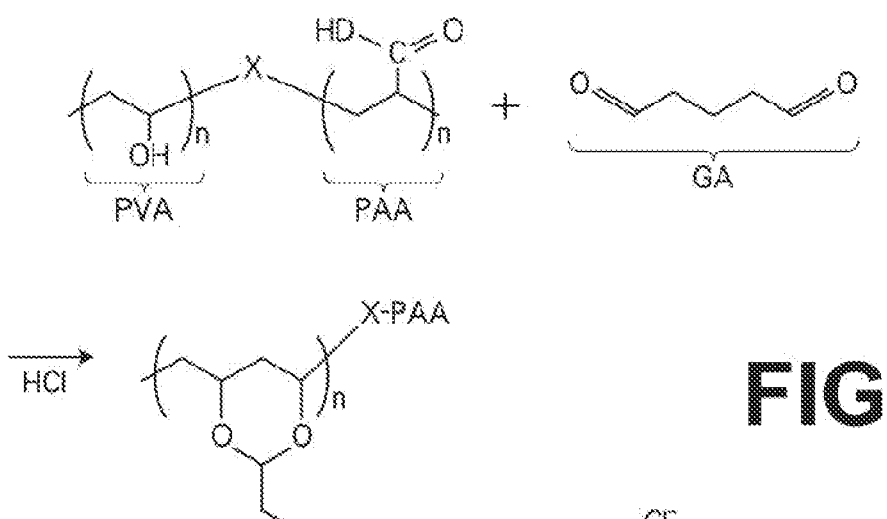
FIG. 2B presents a reaction formula in a case where acetal boning is caused by intermolecular condensation.
Figure 2C:
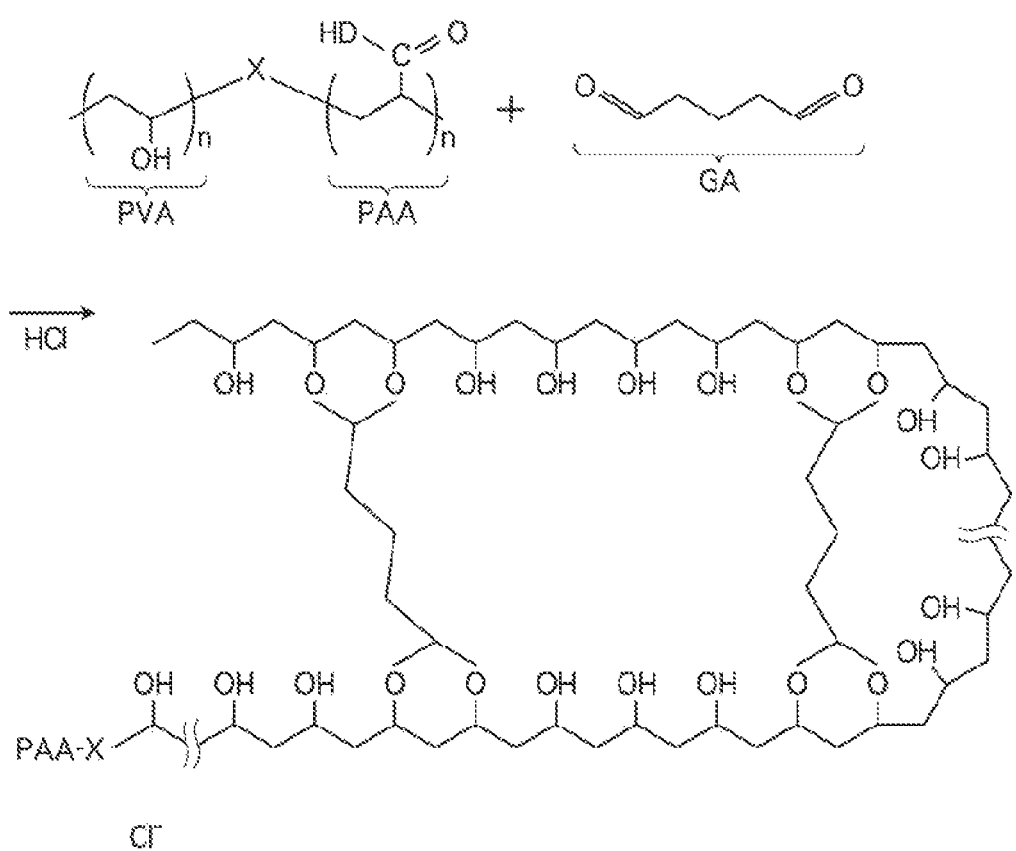
FIG. 2C presents a reaction formula in a case where polyvinyl alcohol causes acetal bonding within a molecule.

FIG. 2A to FIG. 2C present chemical reaction formulas showing one example of production reaction for a coating liquid for acid gas separation (coating liquid) to be used in the present embodiment. FIG. 2A shows an example of an aspect in which the acetal bonds are formed among a plurality of PVA-X-PAA molecules in as aspect in which copolymers formed through linearly bonding of PVA and PAA through the linking group X are crosslinked by using GA in the presence of a hydrochloric acid catalyst, FIG. 2B shows an example of an aspect in which an acetal bond is formed by intermolecular condensation in the foregoing aspect and FIG. 2C shows an example of an aspect in which two hydroxyl groups inside a straight-chain PVA-X-PAA molecule and GA form the acetal bond. In actuality, a crosslinked polyvinyl acetal compound is considered to be formed in a state in which an intramolecular acetal bond and an intermolecular acetal bond are mixed in most of cases. Moreover, all of the aldehyde groups do not always form the acetal bond, and a part in which the hemiacetal bond is formed may also exist. Moreover, exceptionally, a part in which an ester bond is formed with a carboxyl group may also exist.

Moreover, the crosslinked polymer as formed is obtained by a reaction in water. Thus, the crosslinked polymer shown is dispersed into water together with anion of the acid added as the catalyst (chloride ion in FIGS. 2A to C).

Accordingly, the coating liquid for acid gas separation obtained by the present disclosure contains the anion contained in the acid catalyst. In view of a concentration of 3 mol/L or less in the composition, this anion is considered to have no adverse influence on separation characteristics of the acid gas.

(Carrier Addition Step)

In the carrier addition step, the acid gas carrier is added to the reaction liquid and mixed therein during or after the step for forming the above-described acetal bond.

The acid gas carrier includes various kinds of water-soluble compounds showing basicity, and means a substance that indirectly reacts with the acid gas, or a substance per se that directly reacts with the acid gas. Specific examples of the former include a substance that reacts with other gases contained in a fed gas to show basicity, in which the resultant basic compound reacts with the acid gas. More specifically, the acid gas carrier means such an alkali metal compound that reacts with a water vapor to release $OH^-$, in which the resultant $OH^-$ reacts with the acid gas to allow selective incorporation of the acid gas into the membrane. Specific examples of the latter include such a substance per se being basic as a nitrogen-containing compound and sulfur oxide.

Here, specific examples of the acid gas include carbon dioxide ($CO_2$), hydrogen sulfide, carbonyl sulfide, sulfur oxides ($SO_x$) and nitrogen oxides ($NO_x$), and hydrogen halide such as hydrogen chloride.

In the present embodiment, specific examples of the acid gas carrier include an alkali metal compound, a nitrogen-containing compound and sulfur oxides.

Specific examples of the alkali metal compound include at least one kind selected from alkali metal carbonate, alkali metal bicarbonate or alkali metal hydroxide. Here, as the alkali metal, an alkaline metal element selected from cesium, rubidium, potassium, lithium and sodium is preferably used.

In addition, the alkali metal compound herein is used in the meaning of not only the alkali metal per se, but also including salt thereof and ion thereof.

Specific examples of the alkali metal carbonate preferably include lithium carbonate, sodium carbonate, potassium carbonate, rubidium carbonate and cesium carbonate.

Specific examples of the alkali metal bicarbonate preferably include lithium hydrogen carbonate, sodium hydrogen carbonate, potassium hydrogen carbonate, rubidium hydrogen carbonate and cesium hydrogen carbonate.

Specific examples of the alkali metal hydroxide preferably include cesium hydroxide and rubidium hydroxide.

Above all, alkali metal carbonate is preferred, and a compound containing cesium or rubidium is preferred. Moreover, two or more kinds of the acid gas carriers may be mixed and used. Specific examples preferably include a mixture of cesium carbonate and potassium carbonate.

As a content of the acid gas carrier in the coating liquid, although a level depends on a ratio of the carrier to an amount of the hydrophilic compound or a kind of the acid gas carrier, from a viewpoint of exhibition of a function as the acid gas carrier and excellent stability as the acid gas separating layer under a use environment, the content is preferably 0.1 mass % or more and 30 mass % or less, further preferably 0.2 mass % or more and 20 mass % or less, and particularly preferably 0.3 mass % or more and 15 mass % or less.

The coating liquid is obtained, for example, by adding water to the hydrophilic compound while the resultant mixture is stirred, and subsequently adding an aqueous solution of the acid gas carrier thereto, sufficiently stirring the resultant mixture to prepare an aqueous solution containing 2.5 mass % of the hydrophilic compound being the water-soluble polymer and 6.0 mass % of a carbon dioxide carrier promoter, and degassing the solution.

The coating liquid for acid gas separation may contain other components (additives) other than the hydrophilic compound within the range in which the separation characteristics are not adversely affected. Specific examples of the components that may be arbitrarily used include an acid gas absorption promoter, and also a surfactant, a catalyst, an auxiliary solvent and a membrane strength regulator, and also a detecting agent for facilitating a test on existence or nonexistence of defects in the formed acid gas separating layer.

(pH Adjustment Step)

Then, pH of the coating liquid is adjusted toward an acidic side by forming the crosslinked structure by the acid catalyst in the crosslinking step. Accordingly, a pH adjustment step for returning the pH of the coating liquid toward the basic side is necessary.

In the above-described carrier addition step, the acid gas carriers described as the examples include a relatively large number of carriers showing alkalinity. Accordingly, the pH adjustment step is provided as a step identical with the carrier addition step in most of cases.

When the acid gas carrier is not alkaline or when adjustment of pH by addition of the carrier is insufficient, the pH adjustment step for adjusting the pH of the mixed liquid toward the basic side is separately provided.

The coating liquid for acid gas separation obtained as described above is coated onto the porous support 2 formed through lamination between the hydrophobic porous support 2$a$ and the auxiliary support 2$b$ to form the acid gas separation facilitated transport membrane 3 thereon, and thus the acid gas separation composite membrane 1 can be produced.

A method for applying the coating liquid onto the hydrophobic surface of the porous support 2 is not particularly limited, and a conventionally known method can be adopted. Specific examples of the conventionally known application method include a curtain flow coater, an extrusion die coater, an air doctor coater, a blade coater, a rod coater, a knife coater, a squeeze coater, a reverse roll coater and a bar coater. In particular, from viewpoints of membrane thickness uniformity, an amount of coating and so forth, an extrusion die coater is preferred. When the facilitated transport membrane is a laminated membrane having a plurality of layers, a sequential coating method or a simultaneous multilayer coating method may be adopted. The coating liquid is applied onto the hydrophobic porous support 2$a$ by applying these application methods, and the facilitated transport membrane having 1 μm or more and 200 μm or less can be formed, and the facilitated transport membrane 3 having, preferably, 3 μm or more and 150 μm or less, and further preferably 5 μm or more and 130 μm or less can be formed.

The facilitated transport membrane 3 obtained is a hydrogel-state membrane, and contains at least the hydrophilic compound, and the acid gas carrier that reacts with the acid gas inside the gas to be separated. The facilitated transport membrane 3 can separate the gas to be separated, the gas having a high temperature of about 130° C. and containing the water vapor, and has heat and moisture resistance.

Figure 1C:
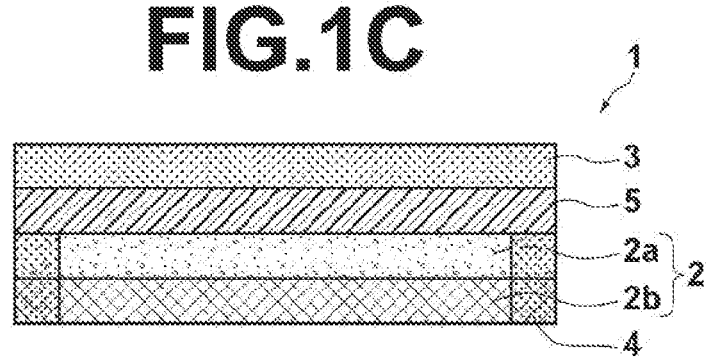
FIG. 1C is a diagram showing a sealed portion in the gas separation composite membrane shown in FIG. 1B.

When the acid gas separation composite membrane 1 is processed into a spiral module as described later, the acid gas separation composite membrane 1 is folded into two, and interposes a flow channel therebetween into a laminate, and the laminates are further laminated by interposing another flow channel. All of the flow channel and the laminate, and the laminate and the flow channel are sealed into an envelope form by the sealed portion using an adhesive. In FIG. 1C, a portion in which sealing is required (sealed portion) upon being processed into a module is shown in terms of a symbol 4, and is provided with the adhesive such as an epoxy resin having excellent heat resistance and hydrolysis resistance.

As described above, the acid gas separation composite membrane 1 is produced by using as the coating liquid the coating liquid for acid gas separation, the coating liquid containing the polyvinyl acetal compound formed through crosslinking, by the acetal bond, the block copolymers formed through bonding of the polymer block formed of polyvinyl alcohol and the polymer block formed of polyacrylate through the linking group, the acid gas carrier and water, and coating the coating liquid onto the porous support 2 having hydrophobicity at least on one surface to form the membrane. According to such a production method, the acid gas separation facilitated transport membrane 3 can be formed on the hydrophobic porous surface of the porous support 2 without causing permeation into micropores of the porous support and nonuniformization on the surface. Consequently, according to the present embodiment, the acid gas separation composite membrane 1 having satisfactory durability under the high temperature, high humidity and high pressure environment can be produced.

As described above, the acid gas facilitated transport membrane 1 can be preferably used in the module for acid gas separation to be used under the high pressure and high humidity environment. A kind of a module 10 for gas separation is not particularly limited, and a module having a known shape such as a flat membrane type, a spiral type and a pleated type can be used, but the spiral type shown in FIG. 3 is particularly preferred. The spiral type module has structure in which a structure having a facilitated transport type gas separation membrane is spirally wound around a perforated hollow central tube, and housed. The spiral type module is preferred in view of a capability of producing the module having a significantly large area of the separation membrane per module. The spiral type module for gas separation is described below, referring to FIG. 3.

"Spiral Type Module for Acid Gas Separation"

FIG. 3 is a partially cut-away schematic structural view showing one embodiment of a spiral type module of the modules for acid gas separation to which the acid gas separation composite membrane shown in FIG. 1C can be preferably applied. The module for acid gas separation is the facilitated transport type module for acid gas separation for separating the fed gas to be separated into the acid gas and the remaining gas other than the acid gas and discharging the resultant gases.

As shown in FIG. 3, the module 10 for acid gas separation separates a fed gas 20 to be separated into a transmitted gas (acid gas) 22 and a remaining gas 24 other than the transmitted gas and discharges the resultant gases. As basic structure thereof, the module 10 is structured such that, in a state in which a singular laminate 14 or plural laminates 14 are wound around a transmitted gas collecting tube 12, an outermost periphery of the laminate 14 is covered with a covering layer 16, and telescope prevention plates 18 are attached to both ends of these units, respectively. In the module 10 for acid gas separation, the module 10 having such structure, if the gas 20 to be separated and containing the acid gas is fed to the laminate 14 from a side of an end portion 10A, the gas 20 to be separated is separated into the acid gas 22 and the remaining gas 24 by structure of the laminate 14 to be described later to discharge the resultant gases separately to a side of the other end portion 10B.

The transmitted gas collecting tube 12 is a cylindrical tube in which a plurality of through-holes 12A are formed on a tube wall thereof. A tube on a side of one end portion (one end portion 10A side) of the transmitted gas collecting tube 12 is closed, and a tube on a side of the other end portion (the other end portion 10B side) is opened to serve as a discharge port 26 through which the acid gas 22 such as carbon dioxide that is transmitted through the laminate 14 and is collected from the through-holes 12A is discharged.

A shape of the through-holes 12A is not particularly limited, but 1 to 20 mmϕ-circular holes are preferably opened. Moreover, the through-holes 12A are preferably uniformly arranged on a surface of the transmitted gas collecting tube 12.

The covering layer 16 is formed of a shutoff material that may shut off the gas 20 to be separated that passes through an inside of the module 10 for acid gas separation. The shutoff material preferably further has the heat and moisture resistance. Here, "heat resistance" of the heat and moisture resistance means that the material has heat resistance of 80° C. or higher. Specifically, the heat resistance of 80° C. or higher means that, even after the material is stored for 2 hours under temperature conditions of 80° C. or higher, a form before storage is maintained, and no visually confirmable curling due to thermal shrinkage or thermal fusion occurs. Moreover, "moisture resistance" of the heat and moisture resistance means that, even after the material is stored for 2 hours under conditions of 40° C. and 80% RH, the form before storage is maintained, and no visually confirmable curling due to thermal shrinkage or thermal fusion occurs.

The telescope prevention plate 18 has an outer periphery annular portion 18A, and an inner periphery annular portion 18B and a radial spoke portion 18C, and each is preferably formed of a heat and moisture-resistant material.

The laminate 14 is structured such that, a member 30 for fed gas flow channel is interposed inside the acid gas separation composite membrane 1 folded into two, and in an inside in a radial direction, the acid gas separation composite membrane 1 is subjected to adhesion onto a member 36 for transmitted gas flow channel through a sealed portion 34S (sealed portion 4 in FIG. 1C) permeated thereto, and sealed.

The number of sheets of laminates 14 to be wound around the transmitted gas collecting tube 12 is not particularly limited and may be singular or plural, but a membrane area of the acid gas separation composite membrane 1 can be increased by increasing the number of sheets (number of lamination). Thus, an amount of the acid gas 22 that can be separated by one module can be increased. Moreover, in order to increase the membrane area, a length of the laminate 14 may be further increased.

Moreover, when the number of sheets of laminates 14 is plural, the number is preferably 50 or less, further preferably 45 or less, and still further preferably 40 or less. If the number is the specified number or less, the laminate 14 can be easily wound therearound, and processing adaptability is improved.

A width of the laminate 14 is not particularly limited, but is preferably 50 mm or more and 100,000 mm or less, further preferably 60 mm or more and 50,000 mm or less, and still further preferably 70 mm or more and 30,000 mm or less.

Further, from a viewpoint of practical use, the width of the laminate 14 is still further preferably 200 mm or more and 2,000 mm or less. The width is adjusted to each lower limit or more. Thus, even if coating (sealing) by the resin is caused, an effective membrane area of the acid gas separation composite membrane 1 can be secured. Moreover, the width is adjusted to an upper limit or less. Thus, horizontally of a winding core can be kept, and occurrence of winding deviation can be suppressed.

Figure 4:
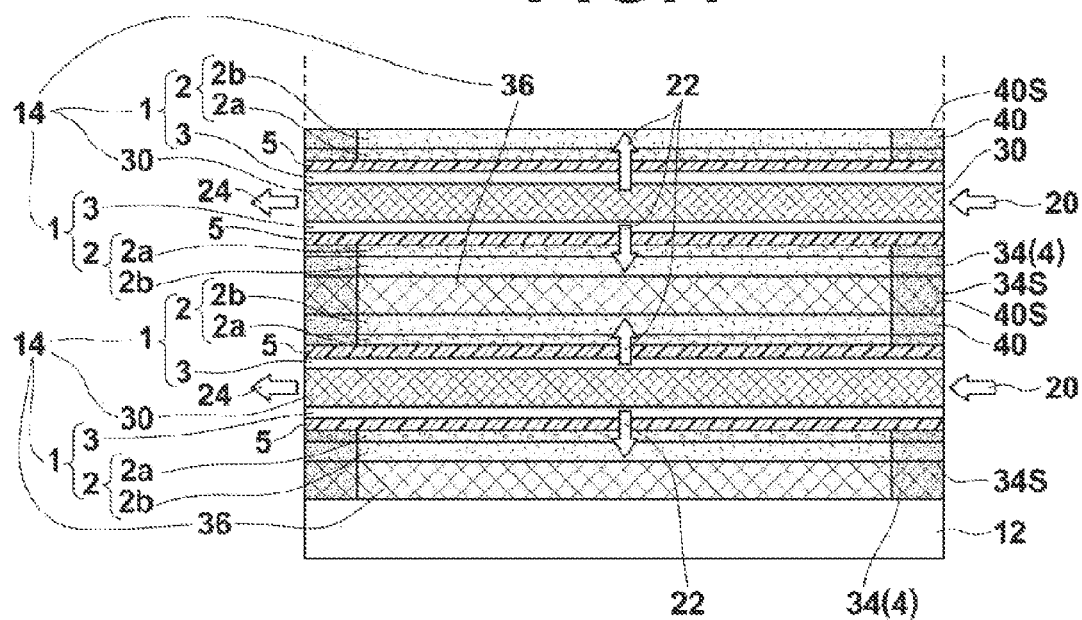
FIG. 4 is a cross-sectional view showing part of cylindrical wound body in which a laminate is wound around a transmitted gas collecting tube.

FIG. 4 is a cross-sectional view showing part of cylindrical wound body in which a laminate is wound around a transmitted gas collecting tube. As shown in FIG. 4, the laminates 14 are subjected to adhesion to each other through a sealed portion 40S that is permeated into the acid gas separation composite membrane 1, and stacked around the transmitted gas collecting tube 12. Specifically, in the laminate 14, a member 36 for transmitted gas flow channel, an acid gas separation composite membrane 1, a member 30 for fed gas flow channel and the acid the gas separation composite membrane 1 are laminated sequentially from a side of the transmitted gas collecting tube 12. Owing to the lamination, the gas 20 to be separated, the gas 20 containing the acid gas 22 is fed from an end portion of the member 30 for fed gas flow channel, the acid gas 22 that is transmitted through the acid gas separation composite membrane 1 divided by the covering layer 16 and separated is accumulated into the transmitted gas collecting tube 12 through the member 36 for transmitted gas flow channel and the through-holes 12A, and is recovered from the discharge port 26 connected to the transmitted gas collecting tube 12. Moreover, the remaining gas 24 from which the acid gas 22 is separated, and which passes through pores of the member 30 for fed gas flow channel or the like is discharged from the member 30 for fed gas flow channel on a side on which the discharge port 26 is provided and an end portion of the acid gas separation composite membrane 1 in the module 10 for acid gas separation.

Figure 5:
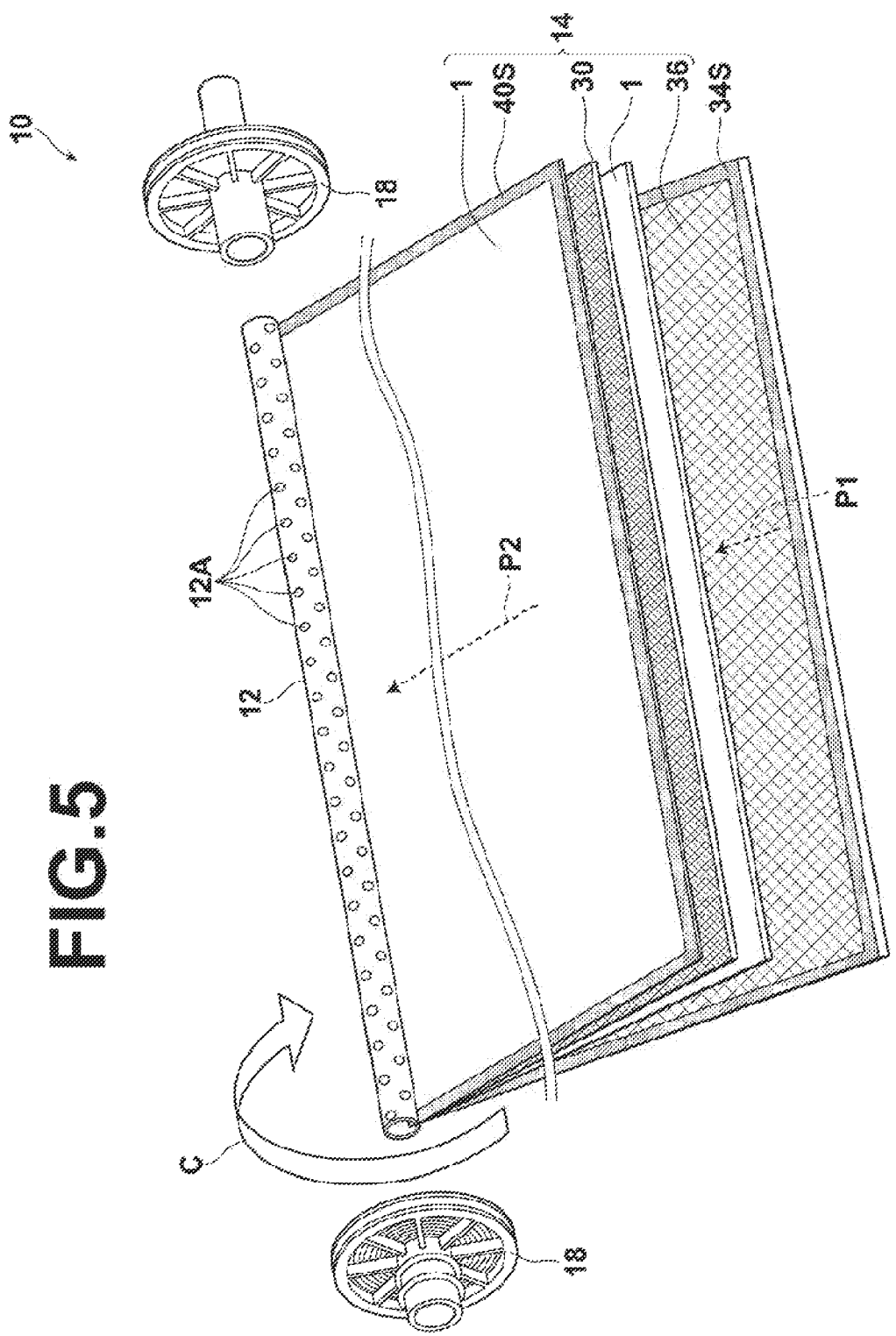
FIG. 5 is a schematic view showing a state before a laminate is wound around a transmitted gas collecting tube.

FIG. 5 is a diagram showing a state before a laminate is wound around a transmitted gas collecting tube, and the diagram showing one embodiment of formation regions of a sealed portion 34S and a sealed portion 40S. As shown in FIG. 5, the sealed portion 40S covers the through-holes 12A with the member 36 for transmitted gas flow channel, and in a state in which the laminate 14 is wound around the transmitted gas collecting tube 12 in an arrow C direction in the figure, the sealed portion 40S causes adhesion of the acid gas separation composite membrane 1 onto the member 36 for transmitted gas flow channel, and simultaneously seals both. Meanwhile, the sealed portion 34S causes adhesion of the acid gas separation composite membrane 1 onto the member 6 for transmitted gas flow channel, and simultaneously seals both, before the laminate 14 is wound around the transmitted gas collecting tube 12.

Both the sealed portion 34S and the sealed portion 40S are formed into a so-called envelope form in which an end portion in a circumferential direction between the acid gas separation composite membrane 1 at winding start, and the member 36 for transmitted gas flow channel is opened. Then, in a region surrounded by the sealed portion 34S, a flow channel P1 is formed through which the acid gas 22 transmitted through the acid gas separation composite membrane 1 flows into the through-holes 12A. In a similar manner, in a region surrounded by the sealed portion 40S, a flow channel P2 is formed through which the acid gas 22 transmitted through the acid gas separation composite membrane 1 flows into the through-holes 12A.

Each element of the module for acid gas separation is similar to a constituent of the above-mentioned laminate for acid gas separation. In the present module for acid gas separation, as the structure of the laminate, the module includes the member 30 for fed gas flow channel. As the member 30 for fed gas flow channel, a member similar to the member for transmitted gas flow channel can be used.

In the facilitated transport membrane 3, the moisture contained in the membrane is oozed out onto the porous support 2 to increase wettability of the porous support 2, or to draw the resin due to surface tension thereof. Thus, the resins of the sealed portion 34S and the sealed portion 40S are easily infused into the pores of the porous support 2 through the member 36 for transmitted gas flow channel. Therefore, even if the sealed portions (34S, 40S) in the circumferential direction are not formed by an injection and sealing method, strong adhesion force between the sealed portion 34S and the sealed portion 40S is obtained by an ordinary coating method, and as a result, gas leak can be suppressed.

In the module 10 for acid gas separation, the resins of sealed portions 34S, 40S are not particularly limited, as long as the resins cause no reduction of sealability by operation. However, if feeding of the gas 20 to be separated, the gas 20 containing the water vapor, at a high temperature is assumed, the resins preferably have moisture and heat resistance. Specific examples of the preferred resin include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinylbutyral, polyester, a cellulose derivative (nitrocellulose), a styrene-butadiene copolymer, various kinds of synthetic rubber resins, a phenolic resin, a urea resin, a melamine resin, a phenoxy resin, a silicon resin and a urea-formamide resin.

A method for producing the module 10 for acid gas separation is described below.

FIG. 6A to FIG. 6C are drawings of a process for producing a module for acid gas separation. In the method for producing the module 10 for acid gas separation, first, as shown in FIG. 6A, a leading end portion of an elongated member 36 for transmitted gas flow channel is fixed to a tube wall (outer periphery) of the transmitted gas collecting tube 12 by a fixing member 55 such as a Kapton tape or an adhesive. Here, a slit (not shown) is preferably provided on the tube wall along a shaft direction. In the above case, the leading end portion of the member 36 for transmitted gas flow channel is put into the slit, and fixed to an inner periphery of the transmitted gas collecting tube 12 by the fixing member 55. According to the above structure, upon winding around the transmitted gas collecting tube 12 the laminate 14 containing the member 36 for transmitted gas flow channel, even if winding is made while tension is applied, no slip out of the member 36 for transmitted gas flow channel is caused from the slit due to friction between the inner periphery of the transmitted gas collecting tube 12 and the member 36 for transmitted gas flow channel, more specifically, fixing of the member 36 for transmitted gas flow channel is maintained.

Next, as shown in FIG. 6B, the elongated member 30 for fed gas flow channel is interposed into a space formed in the elongated acid gas separation composite membrane 1 folded into two by internally placing the acid gas separation facilitated transport membrane 3. In addition, upon folding into two the acid gas separation composite membrane 1, the acid gas separation composite membrane 1 may be divided into two as shown in FIG. 6B, but may be folded into two in a shifted manner.

Next, onto one outer surface (surface of the auxiliary support 2b of the porous support 2) of outer surfaces of the acid gas separation composite membrane 1 folded into two, the adhesive is coated onto a crosswise end portion and a longitudinal end portion of the membrane (coated in the envelope form). Thus, the sealed portion 34S is formed. Before the adhesive 34 is coated, treatment using the organic solvent is applied, as described on the laminated membrane.

Next, as shown in FIG. 6C, onto a surface of the member 36 for transmitted gas flow channel, the member 36 being fixed to the transmitted gas collecting tube 12, the acid gas separation composite membrane 1 interposing the member 30 for fed gas flow channel is pasted through an adhesive 40. In addition, upon pasting the acid gas separation composite membrane 1 thereonto, the membrane 1 is pasted such that one end onto which no adhesive 40 is coated is located on a side of the gas collecting tube 12. Thus, the sealed portion 34S as a whole is formed into a shape in which the end portion in the circumferential direction is opened between the acid gas separation composite membrane 1 at winding start, and the member 36 for transmitted gas flow channel, and in a region surrounded by the sealed portion 34S, the flow channel P1 is formed through which the acid gas 22 transmitted through the acid gas separation composite membrane 1 flows into the through-holes 12A.

Next, onto a surface of the acid gas separation composite membrane 1 pasted onto the member 36 for transmitted gas flow channel (surface of the auxiliary support 2b of the porous support 2 on a surface reverse to the surface onto which the composite membrane 1 is pasted), the adhesive 40 is coated onto a crosswise end portion and a longitudinal end portion of the membrane. Before the adhesive is coated, treatment using the organic solvent is also applied herein. Thus, the adhesive 40 is permeated into the auxiliary support 2b and the hydrophobic porous support 2a, a second sealed portion 40S is formed, and the laminate 14 is formed.

Figure 7:
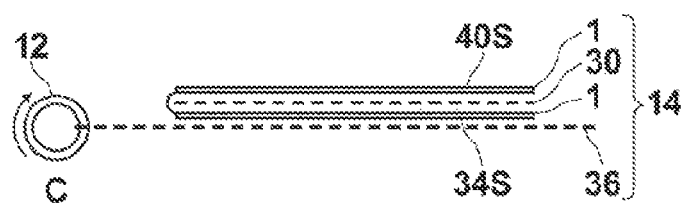
FIG. 7 is a diagram showing s process for producing a spiral type module.

Subsequently, as schematically shown in FIG. 7, the transmitted gas collecting tube 12 is rotated in an arrow C direction. Thus, the laminate 14 is wound around the transmitted gas collecting tube 12 in a multiple manner so as to cover the through-holes 12A with the member 36 for transmitted gas flow channel. On the above occasion, the laminate 14 is preferably wound therearound while tension is applied to the laminate 14.

Figure 8:
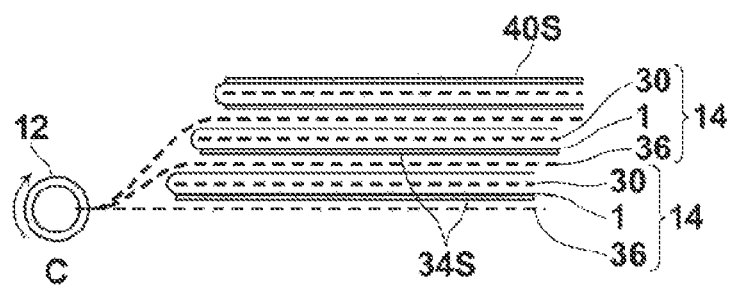
FIG. 8 is a diagram showing a modified example of a process for producing a spiral type module.

In addition, one obtained by interposing the member 30 for fed gas flow channel into the space formed in the acid gas separation composite membrane 1 folded into two is taken as one unit, and the unit and the member 36 for transmitted gas flow channel are alternately laminated. As a result, as shown in FIG. 8, a plurality of the laminates 14 are stacked (by three layers in the present example), and may be wound around the transmitted gas collecting tube in the multiple manner.

The cylindrical wound body is obtained by passing through the steps described above, and both end portions of the cylindrical wound body obtained are subjected to trimming (end face correction processing), and then an outermost periphery of the cylindrical wound body is covered with the covering layer 16, and the telescope prevention plates 18 are attached onto both ends. Thus, the module 10 for acid gas separation shown in FIG. 3 is obtained.

Details of each structure of the module 10 for acid gas separation are described below.

<Member for Transmitted Gas Flow Channel>

As the member 36 for transmitted gas flow channel, a net-shaped member is preferred so as to have a function as a spacer, and a function of allowing a transmitted acid gas to flow inwardly from the member for transmitted gas flow channel, and also a function of allowing permeation of the resin. As a material of the member 36 for transmitted gas flow channel, a material similar to the material of the porous support can be used. Moreover, if flowing of the gas 20 to be separated, the gas containing the water vapor, at a high temperature is assumed, the member 36 for transmitted gas flow channel also preferably has the heat and moisture resistance.

Specific examples of raw materials of the member 36 for transmitted gas flow channel further preferably include a polyester base such as epoxy-impregnated polyester, a polyolefin base such as polypropylene and a fluorine base such as polytetrafluoroethylene.

A thickness of the member 36 for transmitted gas flow channel is not particularly limited, but is preferably 50 μm or more and 1,000 μm or less, further preferably 50 μm or more and 950 μm or less, and still further preferably 50 μm or more and 900 μm or less.

The member 36 for transmitted gas flow channel serves as a flow channel of the acid gas transmitted through the acid gas separation composite membrane 1, and therefore preferably has low resistance. Specifically, the member 36 desirably has high porosity, only limited deformation upon applying pressure, and a small pressure loss. The porosity is preferably 30% or more and 95% or less, further preferably 35% or more and 92.5% or less, and still further preferably 40% or more and 90% or less. In addition, the porosity can be measured as described below. First, water is sufficiently infused into a pore portion of the member for transmitted gas flow channel by utilizing ultrasonic wave or the like, and an excessive amount of moisture on the surface is removed, and then a mass per unit area is measured. A value obtained by subtracting the mass from a dry mass is a volume of water introduced into the pores of the member for transmitted gas flow channel, and is converted using water density, and thus an amount of pores, and eventually the porosity can be measured. On the above occasion, when water is insufficiently infused thereinto, the porosity can be measured also by using a solvent having low surface tension, such as an alcohol base.

The deformation upon applying pressure can be approximated by elongation upon conducting a tensile test, and the elongation upon applying a load of 10 N/10 mm width is preferably within 5%, and further preferably within 4%.

Moreover, the pressure loss can be approximated by a flow rate loss of compressed air that is flowed at a constant flow rate, and upon flowing the compressed air at 15 L/min through a 15 cm-square member 36 for transmitted gas flow channel at room temperature, the compressed air has a loss preferably within 7.5 L/min, and further preferably within 7 L/min.

<Fed Gas Flow Channel Member>

The member 30 for fed gas flow channel is a member to which the gas 20 to be separated, the gas 20 containing the acid gas, is fed, and the member preferably has a function as a spacer, and causes turbulence for the gas 20 to be separated, and thus a net-shaped member is preferably used. A gas flow channel changes depending on a shape of the net. Thus, the shape of a unit lattice of the net is selected from a shape such as a rhombus and a parallelogram according to the purpose, and used. As a material of the member 30 for fed gas flow channel, a material similar to the material of the porous support can be used. Moreover, if flowing of the gas 20 to be separated, the gas 20 containing the water vapor, at a high temperature is assumed, the member 30 for fed gas flow channel also preferably has the heat and moisture resistance.

A thickness of the member 30 for fed gas flow channel is not particularly limited, but is preferably 10 μm or more and 1,000 μm or less, further preferably 50 μm or more and 950 μm or less, and still further preferably 100 μm or more and 900 μm or less.

"Design Change"

As described above, the present disclosure is described on a specific embodiment in detail, but the present disclosure is not limited to such an embodiment, and it is apparent to those skilled in the art that other various embodiments can be formed within the scope of the present disclosure.

Moreover, the above-described coating liquid for acid gas separation per se has good acid gas separation characteristics. Thus, even in an aspect other than the above-described aspect as the facilitated transport membrane formed through application onto the support, the facilitated transport membrane can be preferably used for acid gas separation.

EXAMPLE

The present disclosure is described in more detail based on Examples below.

Preparation of Coating Liquid

Examples 1 to 10

To a polyvinyl alcohol-S-polyacrylic acid Na salt copolymer, pure water was added while the resultant mixture was stirred, and the resultant mixture was heated and stirred to be 25° C. in a liquid temperature at 200 rpm for 10 minutes.

To the mixed liquid, 1 M hydrochloric acid as an acid catalyst and glutaraldehyde as a crosslinking agent were added, and a crosslinking reaction was carried out. When viscosity increased to 1.0 Pa·s at 30 rpm in the number of revolutions in a B type viscometer, 24.87 g of cesium carbonate, 4.14 g of potassium carbonate and a trace amount of surfactant were added thereto, the resultant mixture was sufficiently stirred to continue the reaction. After the viscosity of the reaction liquid became substantially constant, the liquid was degassed to obtain a coating liquid (1) for acid gas separation.

In each example of Examples 1 to 10, a combination of an amount of addition of hydrochloric acid, an amount of addition of glutaraldehyde and a reaction temperature was made different for each Example. Each parameter is described in Table 1.

Reference Example

A coating liquid for acid gas separation was prepared in a manner similar to Example 1 except that polyvinyl alcohol (PVA, manufactured by Sigma-Aldrich Co. LLC) was used in place of Kurastomer AP-20.

Comparative Example 1

A coating liquid for acid gas separation was prepared in a manner similar to Example 1 except that neither hydrochloric acid nor glutaraldehyde was added thereto.

Comparative Example 2

A coating liquid for acid gas separation was prepared in a manner similar to Example 1 except that no glutaraldehyde was added thereto.

Comparative Example 3

A coating liquid for acid gas separation was prepared in a manner similar to Example 1 except for no hydrochloric acid was added thereto.

(Evaluation of Coating Liquid)

Viscosity and uniformity of the coating liquid obtained in each example were evaluated. The viscosity was measured by using a B type viscometer.

Table 1 shows each of production conditions and evaluation results in Examples, Reference Example and Comparative Examples. In Table 1, the uniformity of the coating liquid (coated liquid) is evaluated in four stages of A to D. A case of a viscosity of 1.0 Pa·s or more and no suspended solids was taken as A, a case of a viscosity of 0.8 Pa·s or more and no suspended solids was taken as B, a case of a viscosity of 0.4 Pa·s or more and suspended solids less than 5 pieces/L (the number of suspended solids in 1 liter) was taken as C and a case of a viscosity of less than 0.4 Pa·s or suspended solids of 5 pieces/L or more (the number of suspended solids in 1 liter) was taken as D.

As shown in Table 1, the coating liquid obtained in each of Examples and Reference Example were confirmed to be the coating liquid having viscosity for satisfactory coating adaptability (see Table 1).

However, in Comparative Examples 1 to 3, the coating liquids were confirmed to be the coating liquids having poor coating adaptability in view of the viscosity or the suspended solids (precipitates).

<Production of Carbon Dioxide Separation Composite Membrane>

A hydrophobic porous support (manufactured by GE Energy: Expanded PTFE) was arranged, and on one surface thereof, a coating liquid (1) for carbon dioxide separation in each example was subjected to blade application at a wet thickness of 1 mm and at a rate of 3 m/min to dry the resultant coated membrane by passing the membrane through a drying zone maintained at 60° C. and to form a carbon dioxide separation facilitated transport membrane.

On the carbon dioxide facilitated transport membrane in each example, uniformity of a membrane surface was evaluated by using a laser microscope. The results are shown in Table 1.

A gel membrane on an outermost surface was photographed in 0.1 mm$^2$ to evaluate the membrane surface. A case of no pore-like material observed and a membrane thickness fluctuation less than 5% was taken as A, a case of 1 to 5 pieces of the pore-like defects observed or a membrane thickness fluctuation of 5% or more and less than 10% was taken as B, a case of 5 to 10 pieces of the pore-like defects observed or a membrane thickness fluctuation of 10% or more and 50% or less was taken as C, and a case of 11 or more pieces of the pore-like defects observed or a membrane thickness fluctuation of 50% or more was taken as D.

<Preparation of Spiral Type Carbon Dioxide Separation Membrane Module>

A gas separation composite membrane for carbon dioxide separation as obtained in each example was folded into two by internally placing a carbon dioxide separating layer. A Kapton tape was attached onto a valley portion of the membrane folded into two to reinforce the membrane so as to avoid causing no damage, with an end portion of a fed gas flow channel material, on a surface state of the valley portion of the composite. Then, a 0.5 mm-thick net made from polypropylene was interposed, as a fed gas flow channel material, into a space formed in the carbon dioxide separating layer folded into two. An adhesive (manufactured by Henkel Japan Ltd., E120HP: trade name) formed of an epoxy resin having high viscosity (about 40 Pa·s) was applied thereon to be in an envelope form on a side of an auxiliary support of the laminate, a tricot-knitted transmitted gas flow channel material made from epoxy-impregnated polyester was stacked, and the resultant material was wound around a perforated hollow central tube in a multiple manner to prepare a spiral type carbon dioxide separation membrane module.

<Evaluation of Life of Facilitated Transport Membrane>

As a test gas, a raw material gas: $H_2:CO_2:H_2O=45:5:50$ (flow rate: 2.2 L/min) was fed to an acid gas separation module in each example at a temperature of 130° C. and a total pressure of 301.3 kPa, and an Ar gas (flow rate: 0.6 L/min) was flowed on a transmission side. A transmitted gas was analyzed by gas chromatograph to calculate initial values of a $CO_2$ transmission rate ($P(CO_2)$) and a $CO_2/H_2$ separation factor (a). Moreover, measurement was continued for 50 hours under identical conditions, and rates of change of $P(CO_2)$ and a were calculated.

The results are shown in Table 1. In Table 1, a case of less than 10% in both rates of change of $P(CO_2)$ and a was taken as A, a case 10% or more and less than 15% in the both rates was taken as B, a case of 15% or more and less than 30% in the both rates was taken as C, and a case of 30% or more in the both rates was taken as D.

<Evaluation of Module Performance>

As to an evaluation of performance of an acid gas separation module prepared in each example, a He gas was filled on a feed side, and then the module was sealed, and the evaluation was performed by measuring a period of time during which pressure decreased from 0.34 MPa to 0.3 MPa. A case where the time needed for decrease was 1,000 seconds or more was taken as GOOD, and a case where the time was less than 1,000 seconds was taken as POOR.

<Criteria of Comprehensive Evaluation>

The above-described four types of evaluation experiments were performed, and as a comprehensive evaluation, judgement from A to D was made based on the following criteria. The results are shown in Table 1. A to C were taken as an evaluation in which the problem of the present disclosure was solvable, and D was taken as an evaluation in which the problem of the present disclosure was unsolvable.

Specifically, the evaluation was performed as described below.

A case of POOR in the module performance was taken as Comprehensive evaluation D, a case of GOOD in the module performance, and A in all of evaluations of the coating liquid, the coating membrane surface and the life was taken as Comprehensive evaluation A;

a case of B in at least one of the evaluations of the coating liquid, the coating membrane surface and the life, and A in other evaluations than B taken as Comprehensive evaluation B;

a case of C in at least one of evaluations of the coating liquid, the coating membrane surface and the life, and B in other evaluations than C was taken as Comprehensive evaluation C; and a case of D found in at least one of the evaluations of the coating liquid, the coating membrane surface and the life time was taken as Comprehensive evaluation D.

As shown in Table 1, effectiveness of the present disclosure was shown.

TABLE 1

| | AMOUNT OF ADDITION | | PROCESS | | |
|---|---|---|---|---|---|
| | AMOUNT OF ADDITION OF HCL (g) | AMOUNT OF ADDITION OF GA (g) | REACTION pH | REACTION TEMPERATURE (° C.) | VISCOSITY (Pa · S) |
| EXAMPLE 1 | 23.14 | 3.24 | 1.7 ± 0.3 | RT | 1.20 |
| EXAMPLE 2 | 23.14 | 3.89 | 1.7 ± 0.3 | RT | 1.40 |
| EXAMPLE 3 | 23.14 | 2.51 | 1.7 ± 0.3 | RT | 1.08 |
| EXAMPLE 4 | 28.93 | 3.24 | 1.5 ± 0.5 | RT | 1.04 |
| EXAMPLE 5 | 14.79 | 3.24 | 2.2 ± 0.3 | 30 | 0.60 |
| EXAMPLE 6 | 23.14 | 4.8 | 1.7 ± 0.3 | RT | 1.70 |
| EXAMPLE 7 | 23.14 | 2.21 | 1.7 ± 0.3 | RT | 0.78 |
| EXAMPLE 8 | 12.85 | 3.24 | 2.5 ± 0.3 | 30 | 1.20 |
| EXAMPLE 9 | 34.71 | 3.24 | 1.3 ± 0.3 | RT | 1.40 |
| EXAMPLE 10 | 23.14 | 4.54 | 1.7 ± 0.3 | RT | 1.12 |
| REFERENCE EXAMPLE 1 | 23.14 | 3.24 | 1.7 ± 0.3 | RT | 1.20 |
| COMPARATIVE EXAMPLE 1 | 0.00 | 0.00 | 5.8 ± 0.3 | RT | 0.02 |
| COMPARATIVE EXAMPLE 2 | 23.14 | 0.00 | 1.7 ± 0.3 | RT | 0.02 |
| COMPARATIVE EXAMPLE 3 | 0.00 | 3.24 | 5.8 ± 0.3 | RT | 0.02 |

| | EVALUATION | | | | |
|---|---|---|---|---|---|
| | UNIFORMITY OF COATING LIQUID | UNIFORMITY OF MEMBRANE SURFACE | LIFE | PROCESSED INTO MODULE | COMPREHENSIVE EVALUATION |
| EXAMPLE 1 | A | A | A | GOOD | A |
| EXAMPLE 2 | B | A | A | GOOD | A |
| EXAMPLE 3 | A | B | B | GOOD | B |
| EXAMPLE 4 | B | B | A | GOOD | B |
| EXAMPLE 5 | B | B | B | GOOD | B |

TABLE 1-continued

| EXAMPLE 6 | C | C | C | GOOD | C |
|---|---|---|---|---|---|
| EXAMPLE 7 | A | B | C | GOOD | C |
| EXAMPLE 8 | C | C | C | GOOD | C |
| EXAMPLE 9 | C | C | B | GOOD | C |
| EXAMPLE 10 | C | C | B | GOOD | C |
| REFERENCE EXAMPLE 1 | B | B | B | GOOD | B |
| COMPARATIVE EXAMPLE 1 | D | D | D | POOR | D |
| COMPARATIVE EXAMPLE 2 | D | D | D | POOR | D |
| COMPARATIVE EXAMPLE 3 | D | D | D | POOR | D |

What is claimed is:

1. A method for producing an acid gas separation composite membrane provided with an acid gas separation facilitated transport membrane on a porous support, comprising;
   arranging of a coating liquid for acid gas separation formed through dispersing or dissolving into water a polyvinyl acetal compound formed through crosslinking, by an acetal bond, block copolymers formed through bonding of a polymer block formed of polyvinyl alcohol and a polymer block formed of polyacrylate through a linking group,
   an acid gas carrier, and
   at least one kind of anion other than hydroxide ion, carboxyl ion, carbonate ion and bicarbonate ion, and
   coating of the coating liquid for acid gas separation onto the surface of the porous support having hydrophobicity at least on one surface to form the acid gas separation facilitated transport membrane thereon.

2. The method for producing the acid gas separation composite membrane according to claim 1, wherein the linking group is a sulfide group.

3. The method for producing the acid gas separation composite membrane according to claim 1, wherein viscosity of the coating liquid for acid gas separation is 0.4 Pa·s or more and 50 Pa·s or less.

4. The method for producing the acid gas separation composite membrane according to claim 1, wherein a contact angle between water and the one surface of the porous support is 100 degrees or more.

5. The method for producing the acid gas separation composite membrane according to claim 1, wherein the porous support is composed of a fluorine-based resin.

6. The method for producing the acid gas separation composite membrane according to claim 5, wherein the fluorocarbon resin is polytetrafluoroethylene.

7. The method for producing the acid gas separation composite membrane according to claim 1, wherein the coating liquid for acid gas separation is coated onto the surface of the porous support through a hydrophobic intermediate layer having gas permeability.

8. The method for producing the acid gas separation composite membrane according to claim 7, wherein the intermediate layer is a silicone resin layer.

9. A facilitated transport type module for acid gas separation for separating a fed gas to be separated into an acid gas and a remaining gas other than the acid gas, and discharging the resultant gases, comprising;
   a member for fed gas flow channel through which the gas to be separated and the remaining gas are transmitted,
   an acid gas separation composite membrane produced by the method for producing the acid gas separation composite membrane according to claim 1, and
   a member for transmitted gas flow channel through which the acid gas that is resulted from a reaction with the acid gas carrier and transmitted through the acid gas separation composite membrane flows.

10. A method for preparing a coating liquid for acid gas separation, comprising:
    a reaction liquid preparation step for preparing a reaction liquid by dissolving into water a block copolymer formed through bonding of a polymer block formed of polyvinyl alcohol and a polymer block formed of polyacrylate through a linking group,
    a crosslinking step for forming crosslinked structure by adding dropwise to the reaction liquid a crosslinking agent having an aldehyde group and an acid catalyst to form an acetal bond by the polyvinyl alcohol and the crosslinking agent while a temperature of the reaction liquid is maintained at 25° C. to 50° C.,
    a carrier addition step for adding to the reaction liquid an acid gas carrier and mixing the resultant mixture during or after the crosslinking step, and
    a pH adjustment step for adjusting pH of the reaction liquid toward a basic side after the crosslinking step.

11. A coating liquid for acid gas separation, comprising a polyvinyl acetal compound formed through formation of crosslinked structure by an acetal bond, an acid gas carrier and water, wherein
    the polyvinyl acetal compound has a plurality of polyacrylic acid salt blocks formed through bonding through a sulfide group, and
    the coating liquid contains at least one kind of anion other than hydroxide ion, carboxyl ion, carbonate ion and bicarbonate ion.

* * * * *